United States Patent
Yang et al.

(10) Patent No.: US 12,513,614 B2
(45) Date of Patent: Dec. 30, 2025

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Haorui Yang, Guangdong (CN); Zhe Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 334 days.

(21) Appl. No.: 18/190,601

(22) Filed: Mar. 27, 2023

(65) Prior Publication Data
US 2023/0239780 A1 Jul. 27, 2023

Related U.S. Application Data

(63) Continuation of application No. PCT/CN2021/074462, filed on Jan. 29, 2021.

(51) Int. Cl.
*H04W 48/18* (2009.01)
*H04W 48/16* (2009.01)
*H04W 60/04* (2009.01)

(52) U.S. Cl.
CPC ........... *H04W 48/18* (2013.01); *H04W 48/16* (2013.01); *H04W 60/04* (2013.01)

(58) Field of Classification Search
CPC ..... H04W 48/18; H04W 24/02; H04W 60/04; H04W 76/10; H04W 84/042;
(Continued)

(56) References Cited

U.S. PATENT DOCUMENTS 10,462,644 B2   10/2019  Ramle et al.
2018/0332523 A1*  11/2018  Faccin ................. H04W 36/13
(Continued)

FOREIGN PATENT DOCUMENTS

CN   107343306 A    11/2017
CN   108924926 A    11/2018
(Continued)

OTHER PUBLICATIONS

3GPP TS 23.501 V16.7.0 (Dec. 2020), 3rd Generation Partnership Project; Technical Specification Group Services and System Aspects; System architecture for the 5G System (5GS); Stage 2 (Release 16) (442 pages).
(Continued)

*Primary Examiner* — Quan M Hua
(74) *Attorney, Agent, or Firm* — PERKINS COIE LLP

(57) ABSTRACT

The implementations of the present application provide a wireless communication method, a terminal device, and a network device. The network device may configure an index list of S-NSSAI comprising index information of some or all of S-NSSAIs of a service network, and indicate the index list of S-NSSAI to the terminal device, so that the terminal device learns a network slice supported by a base station. The wireless communication method comprises: a terminal device receiving first information, wherein the first information comprises an index list of S-NSSAI, and the index list of S-NSSAI comprises index information of some or all of S-NSSAIs of a service network.

9 Claims, 4 Drawing Sheets

(58) Field of Classification Search
CPC ..... H04W 28/16; H04W 88/18; H04W 48/16; H04W 8/02; H04W 28/0268; H04W 28/0967; H04W 28/24; H04W 60/00; H04W 74/0833; H04W 4/08; H04W 4/50; H04W 72/569; H04W 74/002; H04W 74/0816; H04W 74/0875; H04W 76/12; H04W 76/19; H04W 76/20
See application file for complete search history.

(56) References Cited

U.S. PATENT DOCUMENTS

| | | | |
|---|---|---|---|
| 2019/0261185 A1* | 8/2019 | Velev | H04W 48/18 |
| 2019/0268835 A1* | 8/2019 | Shan | H04W 48/16 |
| 2020/0145818 A1* | 5/2020 | Lee | H04L 9/0869 |
| 2021/0136675 A1* | 5/2021 | Lee | H04W 48/16 |
| 2021/0176702 A1* | 6/2021 | Velev | H04W 8/02 |
| 2022/0014938 A1 | 1/2022 | Hong | |

FOREIGN PATENT DOCUMENTS

| | | |
|---|---|---|
| CN | 109565451 A | 4/2019 |
| CN | 109964509 A | 7/2019 |
| CN | 110235471 A | 9/2019 |
| CN | 110366241 A | 10/2019 |
| CN | 110876174 A | 3/2020 |
| CN | 111566997 A | 8/2020 |
| CN | 111769964 A | 10/2020 |
| WO | 2020216099 A1 | 10/2020 |

OTHER PUBLICATIONS

3GPP TS 23.502 V16.7.0 (Dec. 2020), 3rd Generation Partnership Project; Technical Specification Group Services and System Aspects; Procedures for the 5G System (5GS); Stage 2 (Release 16) (597 pages).
International Search Report with English translation mailed Oct. 25, 2021 of PCT/CN2021/074462 (4 pages).
Written Opinion with English translation mailed Oct. 25, 2021 of PCT/CN2021/074462 (9 pages).
First Examination Report for European Application No. 21921877.3 issued Jul. 5, 2024. 12 pages.
First Office Action for Chinese Application No. 202310334941.8 issued Jul. 27, 2024. 12 pages with English translation.
Second Examination Report for European Application No. 21921877.3 issued Dec. 19, 2024. 12 pages.
Second Office Action for Chinese Application No. 202310334941.8 issued Nov. 16, 2024. 10 pages with English translation.
Search Report of the European application No. 21921877.3, issued on Dec. 4, 2023. 13 pages.
3GPP: "3rd Generation Partnership Project; Technical Specification Group Services and System Aspects; System Architecture for the 5G System; Stage 2 (Release 15)",3GPP TS 23.501 V1.4.0, Sep. 1, 2017 (Sep. 1, 2017), 151pages.
ZTE et al: "23.501: Network Slicing Roaming Support (OI#2 & OI#3)", 3GPP Draft; S2-177037, SA WG2 Meeting #123, Oct. 23-27, 2017, Ljubljana, Slovenia; 13 pages.
Examination Report of the European application No. 21921877.3, issued on Jun. 12, 2025. 12 pages.

* cited by examiner

WIRELESS COMMUNICATION METHOD, TERMINAL DEVICE, AND NETWORK DEVICE

CROSS-REFERENCE TO RELATED APPLICATION(S)

This application is a continuation application of International Application No. PCT/CN2021/074462, filed on Jan. 29, 2021, the entire disclosure of which is hereby incorporated by reference.

TECHNICAL FIELD

Implementations of the present application relate to the field of communication, and more specifically, to a wireless communication method, a terminal device, and a network device.

BACKGROUND

In a 5G system, the network slice is deployed. Considering that different cells may support different network slices, in order for a terminal device to choose one cell that can support a slice it wants to use, a base station needs to let the terminal device know a network slice supported by the base station. However, how the base station lets the terminal device know the network slice it supports is an urgent problem to be solved.

SUMMARY

An implementation of the present application provides a wireless communication method, a terminal device, and a network device. The network device may configure an index list of S-NSSAI including index information of part or all of S-NSSAIs of a serving network, and indicate the index list of S-NSSAI to the terminal device, so that the terminal device learns a network slice supported by a base station.

In a first aspect, a wireless communication method is provided, which includes: receiving, by a terminal device, first information; wherein the first information includes an index list of S-NSSAI, wherein the index list of S-NSSAI includes index information of part or all of S-NSSAIs of a serving network.

In a second aspect, a wireless communication method is provided, which includes: sending, by a network device, first information to a terminal device; wherein the first information includes an index list of S-NSSAI, wherein the index list of S-NSSAI includes index information of part or all of S-NSSAIs of a serving network.

In a third aspect, a terminal device is provided, configured to perform the method according to the first aspect described above.

Specifically, the terminal device includes functional modules configured to perform the method according to the first aspect described above.

In a fourth aspect, a network device is provided, configured to perform the method according to the second aspect described above.

Specifically, the network device includes functional modules configured to perform the method according to the second aspect described above.

In a fifth aspect, there is provided a terminal device including a processor and a memory. The memory is configured to store a computer program, and the processor is configured to call and run the computer program stored in the memory to perform the method in the first aspect described above.

In a sixth aspect, a network device is provided, which includes a processor and a memory. The memory is configured to store a computer program, and the processor is configured to call and run the computer program stored in the memory to perform the method in the second aspect described above.

In a seventh aspect, an apparatus is provided, which is configured to implement the method in any one of the first to second aspects described above.

Specifically, the apparatus includes a processor, configured to call and run a computer program from a memory, so that a device disposed with the apparatus performs the method according to any one of the first to second aspects described above.

In an eighth aspect, a computer-readable storage medium is provided, which is configured to store a computer program that enables a computer to perform the method in any one of the first to second aspects.

In a ninth aspect, a computer program product is provided, which includes computer program instructions that enable a computer to perform the method in any one of the first to second aspects.

In a tenth aspect, a computer program is provided. When being run on a computer, the computer program enables the computer to perform the method in any one of the first to second aspects.

According to the above technical solution, a network device may configure an index list of S-NSSAI including index information of part or all of S-NSSAIs of a serving network, and indicate the index list of S-NSSAI to a terminal device, so that the terminal device learns a network slice supported by a base station.

DETAILED DESCRIPTION

Figure 1:
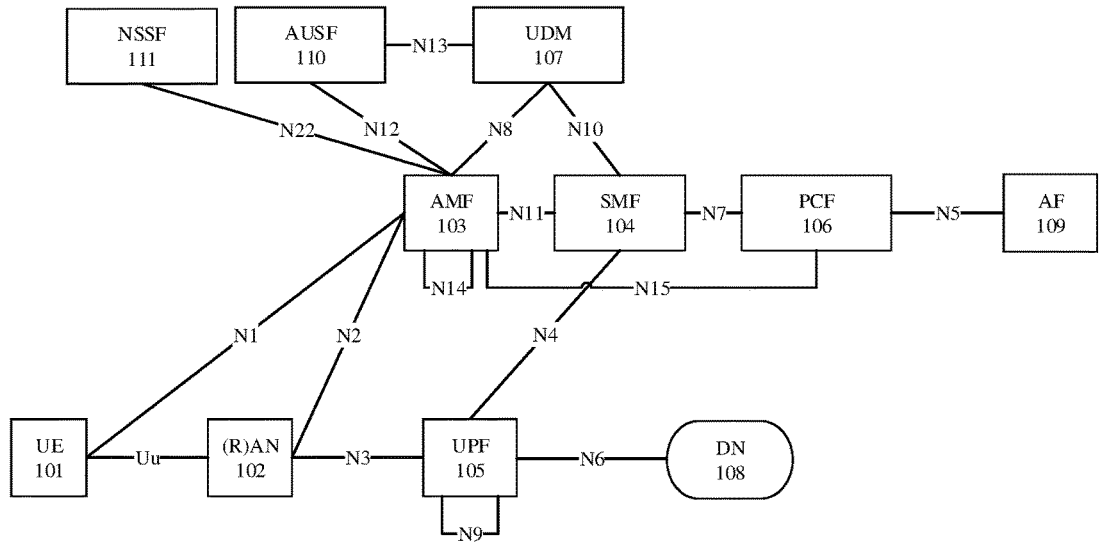
FIG. 1 is a schematic diagram of an architecture of a communication system to which an implementation of the present application applies.

Technical solutions in the implementations of the present application will be described below with reference to the accompanying drawings in the implementations of the present application. It is apparent that the implementations described are just a part of the implementations of the present application, rather than all of the implementations of the present application. With regard to the implementations of the present application, all other implementations obtained by a person of ordinary skill in the art without making an inventive effort are within the protection scope of the present application.

Technical solutions according to implementations of the present application may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Non-Terrestrial Networks (NTN) system, a Universal Mobile Telecommunications System (UMTS), Wireless Local Area Networks (WLAN), Wireless Fidelity (WiFi), a 5th-Generation (5G) communication system, or another communication system, etc.

Generally, traditional communication systems support a limited quantity of connections, and are easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., and the implementations of the present application may be applied to these communication systems as well.

In some implementations, the communication systems in the implementations of the present application may be applied to a Carrier Aggregation (CA) scenario, or a Dual Connectivity (DC) scenario, or a Standalone (SA) networking scenario.

In some implementations, the communication system in the implementations of the present application may be applied to an unlicensed spectrum, wherein the unlicensed spectrum may also be considered as a shared spectrum; or, the communication system in the implementations of the present application may also be applied to a licensed spectrum, wherein the licensed spectrum may also be considered as a non-shared spectrum.

Various implementations of the present application are described in combination with the network device and the terminal device. The terminal device may also be referred to as a User Equipment (UE), an access terminal, a subscriber unit, a subscriber station, a mobile station, a mobile platform, a remote station, a remote terminal, a mobile device, a user terminal, a terminal, a wireless communication device, a user agent or a user apparatus, etc.

The terminal device may be a STATION (ST) in the WLAN, or may be a cellular phone, a wireless phone, a Session Initiation Protocol (SIP) phone, a Wireless Local Loop (WLL) station, a Personal Digital Assistant (PDA) device, a handheld device with a wireless communication function, a computing device, or other processing devices connected to a wireless modem, a vehicle-mounted device, a wearable device, a terminal device in a next generation communication system, such as an NR network, or a terminal device in a future evolved Public Land Mobile Network (PLMN), etc.

In an implementation of the present application, a terminal device may be deployed on land including indoor or outdoor, handheld, wearable or vehicle-mounted; or it may be deployed on water (such as on ships, etc.); or it may be deployed aerially (such as in airplanes, balloons and satellites, etc.).

In an implementation of the present application, the terminal device may be a mobile phone, a Pad, a computer with wireless transceiving function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home, etc.

As an example rather than limitation, in the implementations of the present application, the terminal device may be a wearable device. The wearable device may also be referred to as a wearable smart device, which is a general term of wearable devices developed by intelligent design on daily wear by applying wearable technology, such as glasses, gloves, a watch, clothing and shoes. The wearable device is a portable device that is worn directly on a body, or integrated into clothes or accessories of users. The wearable device not only is a hardware device, but also implements powerful functions through software support as well as data interaction or cloud interaction. Generalized wearable smart devices include devices which are fully functional, have large sizes, and may implement complete or partial functions without relying on smart phones, such as a smart watch or smart glasses, and devices which focus on a certain kind of application functions only and need to be used in conjunction with other devices such as smart phones, such as various smart bracelets, smart jewelries or the like for monitoring physical signs.

In an implementation of the present application, the network device may be a device configured to communicate with a mobile device, and may be an Access Point (AP) in the WLAN, a Base Transceiver Station (BTS) in GSM or CDMA, a NodeB (NB) in WCDMA, an Evolutional Node B (eNB or eNodeB) in LTE, a relay station or an access point, a vehicle-mounted device, a wearable device, a network device or a gNB in an NR network, a network device in the future evolved PLMN network, or a network device in an NTN network, etc.

As an example rather than limitation, in an implementation of present application, the network device may be of mobility, for example, the network device may be a mobile device. In some implementations, the network device may be a satellite, or a balloon station. For example, the satellite may be a low earth orbit (LEO) satellite, a medium earth orbit (MEO) satellite, a geostationary earth orbit (GEO) satellite, a high elliptical orbit (HEO) satellite, etc. In some implementations, the network device may be a base station disposed in a position on land or in a water region, etc.

In an implementation of the present application, the network device may provide a service for a cell, and the terminal device communicates with the network device through a transmission resource (e.g., a frequency domain resource, which is also referred to as a spectrum resource) used by the cell, wherein the cell may be a cell corresponding to the network device (e.g., a base station), and the cell may belong to a macro base station, or may belong to a base station corresponding to a Small cell. The Small cell herein may include a Metro cell, a Micro cell, a Pico cell, or a Femto cell, etc. The Small cells are characterized by a small coverage range and a low transmission power, and are suitable for providing high-speed data transmission services.

FIG. 1 exemplarily shows a schematic diagram of a communication system 100 to which the present application applies. As shown in FIG. 1, the communication system 100 mainly includes a User Equipment (UE) 101, an Access Network (AN) device 102, an Access and Mobility Management Function (AMF) entity 103, a Session Management Function (SMF) entity 104, a User Plane Function (UPF) entity 105, a Policy Control function (PCF) entity 106, a Unified Data Management (UDM) entity 107, a Data Network (DN) 108, an Application Function (AF) entity 109, an Authentication Server Function (AUSF) entity 110, and a Network Slice Selection Function (NSSF) entity 111.

Specifically, in the communication system 100, the UE 101 performs an access stratum connection with the AN device 102 through a Uu interface to exchange an access stratum message and a wireless data transmission, and the UE 101 performs a Non-Access Stratum (NAS) connection with the AMF entity 103 through an N1 interface to exchange an NAS message; the AN device 102 is connected with the AMF entity 103 through an N2 interface, and the AN device 102 is connected with the UPF entity 105 through an N3 interface; multiple UPF entities 105 are connected with each other through an N9 interface, the UPF entity 105 is connected with the DN 108 through an N6 interface, and the UPF entity 105 is connected with the SMF entity 104 through an N4 interface; the SMF entity 104 is connected with the PCF entity 106 through an N7 interface, the SMF entity 104 is connected with the UDM entity 107 through an N10 Interface, the SMF entity 104 controls the UPF entity 105 through an N4 interface, and the SMF entity 104 is connected with the AMF entity 103 through an N11 Interface; multiple AMF entities 103 are connected with each other through an N14 interface, the AMF entity 103 is connected with the UDM entity 107 through an N8 interface, the AMF entity 103 is connected with the AUSF entity 110 through an N12 interface, the AMF entity 103 is connected with the NSSF entity 111 through an N22 interface, and the AMF entity 103 is connected with the PCF entity 106 through an N15 interface; the PCF entity 106 is connected with the AF entity 109 through an N5 interface; and the AUSF entity 110 is connected with the UDM entity 107 through an N13 interface.

In the communication system 100, the UDM entity 107 is a subscription database in a core network, storing subscription data of a user in a 5G network. The AMF entity 103 is a mobility management function in the core network, and the SMF entity 104 is a session management function in the core network. The AMF entity 103 is responsible for forwarding a message related to session management between the UE 101 and the SMF entity 104 in addition to performing mobility management for the UE 101. The PCF entity 106 is a policy management function in the core network, and is responsible for formulating policies related to mobility management, session management, billing, and the like for the UE 101. The UPF entity 105 is a user plane function in the core network and performs a data transmission with an external data network through the N6 interface and a data transmission with the AN device 102 through the N3 interface. After the UE 101 accesses the 5G network through the Uu interface, a Protocol Data Unit (PDU) session data connection between the UE 101 and the UPF entity 105 is set up under controlling of the SMF entity 104, thereby performing a data transmission. The AMF entity 103 and SMF entity 104 acquire subscription data of a user from the UDM entity 107 through the N8 and N10 interfaces respectively, and policy data from the PCF entity 106 through the N15 and N7 interfaces respectively.

It should be understood that the terms "system" and "network" are often used interchangeably herein. The term "and/or" herein refers to an association relationship describing associated objects only, which indicates that there may be three kinds of relationships, for example, A and/or B may indicate three cases: A alone, both A and B, and B alone. In addition, the symbol "/" herein generally indicates that objects before and after the symbol "/" have an "or" relationship.

Terminologies used in implementation sections of the present application are only for the purpose of explaining specific implementations of the present application, and are not intended to limit the present application. Terms "first", "second", "third" and "fourth", or the like in the specification, claims and drawings of the present application are used to distinguish different objects and not used to describe a specific order. In addition, terms "include" and "have" and any variations thereof are intended to cover non-exclusive inclusion.

It should be understood that "indication" involved in implementations of the present application may be a direct indication, may be an indirect indication, or may represent an association relationship. For example, that A indicates B may mean that A indicates B directly, for example, B can be acquired through A; or it may mean that A indicates B indirectly, for example, A indicates C, and B can be acquired through C; or it may mean that there is an association between A and B.

In the description of the implementations of the present application, the term "correspond" may mean that there is a directly corresponding or an indirectly corresponding relationship between two parties, or mean that there is an association between two parties, or mean a relationship such as indicating and being indicated, configuring and being configured, etc.

In implementations of the present application, "predefined" may be achieved by pre-storing a corresponding code, a table, or other modes that may be used to indicate related information in a device (e.g., including the terminal device and the network device), and its specific implementation is not limited in the present application. For example, predefined may refer to what is defined in a protocol.

In an implementation of the present application, the "protocol" may refer to a standard protocol in the communication field, for example, may include an LTE protocol, an NR protocol, and a related protocol applied in a future communication system, which are not limited in the present application.

In order to facilitate better understanding of the implementations of the present application, a network slice related to the present application is described.

The network slice may be identified by using Single-Network Slice Selection Assistance Information (S-NSSAI). The set of S-NSSAI becomes Network Slice Selection Assistance Information (NSSAI).

When the terminal device needs to use the network slice, it needs to request use of slice to a network first. After the network agrees, it establishes a Protocol Data Unit (PDU) session in the slice to transmit data.

The terminal device places S-NSSAI to be requested in Requested NSSAI according to a service, and the Requested NSSAI is included in a Registration request and sent to the AMF entity. The AMF entity determines the Allowed NSSAI according to a subscription of the terminal device and a range of a deployment of network slice, and sends it to the terminal device in Registration accept, and also sends it to a Radio Access Network (RAN) of the base station in an N2 message.

After receiving the Allowed NSSAI, the terminal device needs to establish a PDU session in a slice in the Allowed NSSAI. The establishment of the PDU session is completed, and then data may be sent and received.

During network deployment, a coverage range of each slice may be different. When deciding the Allowed NSSAI, the AMF entity needs to ensure that all slices in the Allowed NSSAI may cover a Registration area (a Tracking Area (TA) list) allocated by the AMF entity to the terminal device. The AMF entity obtains the S-NSSAI supported by the base station and a corresponding TA from the base station through a Next Generation Evolutional NodeB (NG-eNB) setup request or RAN configuration update signaling.

In Release 17, considering that different cells may support different network slices, in order for the terminal device to select one cell that can support a slice it wants to use, the base station needs to let the terminal device know a network slice supported by the base station.

If the base station directly places slice information, such as S-NSSAI (32 bits), in broadcast information, since the base station may support multiple slices, it needs to broadcast multiple S-NSSAIs, which will make the broadcast information too large and occupy a lot of broadcast resources.

In addition, since the S-NSSAI may be defined by an operator, if it is directly placed in the broadcast information, there is a problem of privacy exposure.

Based on the above problem, the present application provides a solution for configuring an index list of S-NSSAI. A network device may configure an index list of S-NSSAI including index information of part or all of S-NSSAIs of a serving network, and indicate the index list of S-NSSAI to a terminal device, so that the terminal device learns a network slice supported by a base station.

Technical solutions of the present application will be described in detail below with specific implementations.

Figure 2:
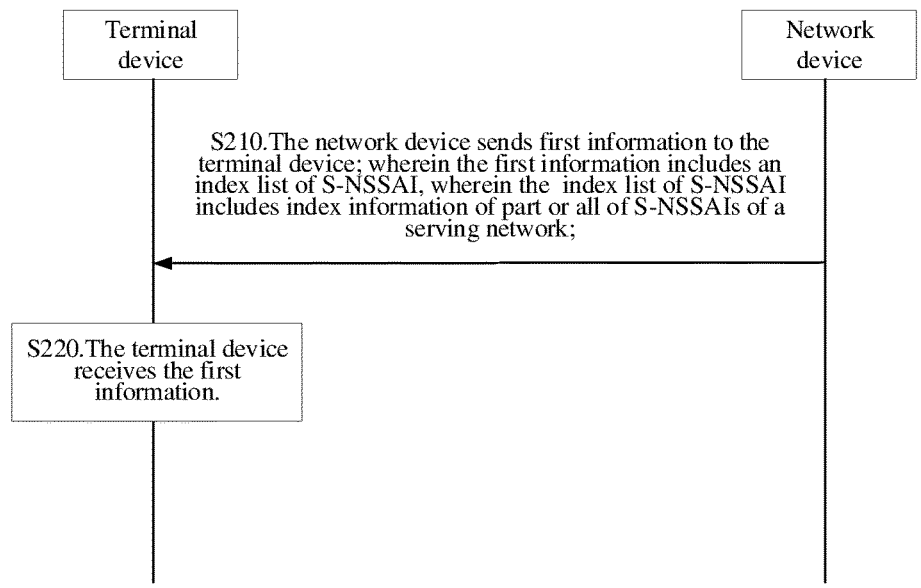
FIG. 2 is a schematic flow chart of a wireless communication method according to an implementation of the present application.

FIG. 2 is a schematic flow chart of a wireless communication method 200 according to an implementation of the present application. As shown in FIG. 2, the method 200 may include at least part of the following contents S210 to S220.

In S210, a network device sends first information to a terminal device; wherein the first information includes an index list of S-NSSAI, wherein the index list of S-NSSAI includes index information of part or all of S-NSSAIs of a serving network.

In S220, the terminal device receives the first information.

In an implementation of the present application, the terminal device may determine part or all of the S-NSSAIs supported by the serving network based on the index list of S-NSSAI. Directly broadcasting, by the network device, part or all of the S-NSSAIs supported by the serving network occupies a lot of broadcast resources, and a problem of privacy exposure are avoided.

It should be noted that the index list of S-NSSAI is an expression form of index information of part or all of the S-NSSAIs of the serving network, and the index information of part or all of the S-NSSAIs of the serving network may also be expressed by the set of S-NSSAI indices or a similar concept, which are not limited by the implementation of the present application.

In some implementations, the serving network is a Public Land Mobile Network (PLMN) or Stand-alone Non-public Networks (SNPN).

In some implementations, the terminal device may perform at least one of the following according to the index list of S-NSSAI: cell selection, cell reselection, and search before cell handover.

For example, after the terminal device acquires the index list of S-NSSAI, the terminal device stores the index list of S-NSSAI and sends the index list of S-NSSAI, or S-NSSAI indices or S-NSSAIs corresponding to a service to an Access Stratum (AS) (e.g. a Radio Resource Control (RRC) layer) of the terminal device. The AS layer of the terminal device uses indices to select a cell that can support these indices as a resident cell of the terminal device.

In some implementations, the first information is contained in a Non-Access Stratum (NAS) message, or the first information is contained in an RRC message.

For example, in a case where the first information is contained in the NAS message, the network device is an AMF entity.

For example, in a case where the first information is contained in the RRC message, the network device is a serving base station.

As a first example, the first information is contained in the NAS message. For example, the network device is an AMF entity, that is, the AMF entity sends the first information to the terminal device.

In the first example, for example, the serving network is a visited network. For example, the serving network is a visited-PLMN (V-PLMN), or the serving network is a visited-SNPN (V-SNPN).

In the first example, for example, the index list of S-NSSAI includes the index information of all of the S-NSSAIs of the serving network.

For example, index information of part of the S-NSSAIs among the index information of all of the S-NSSAIs contains index information of S-NSSAIs subscribed by the terminal device.

In an implementation of the first example, the index list of S-NSSAI may be generated by an AMF entity. For example, the AMF entity generates the index list of S-NSSAI according to indices corresponding to S-NSSAIs of the serving network.

Specifically, taking the serving network being the PLMN as an example, the SNPN is similar. If the AMF entity is configured locally with an index corresponding to a slice, a Subscribed index list of S-NSSAI is generated. If the AMF entity is an AMF of the V-PLMN, V-PLMN S-NSSAI corresponding to a subscribed slice is found and a V-PLMN index list of S-NSSAI is generated. That is, an index corresponding to S-NSSAI of a current PLMN is unique in the whole PLMN.

In another implementation of the first example, the index list of S-NSSAI may be generated by an NSSF entity. For example, the AMF entity receives the index list of S-NSSAI sent by the NSSF entity.

Specifically, taking the serving network being the PLMN as an example, the SNPN is similar. The AMF entity sends a subscribed slice of the terminal device and a subscribed slice change indication to the NSSF entity, and may indicate that the NSSF entity is required to provide the index list of S-NSSAI, and the NSSF entity generates a Subscribed index list of S-NSSAI according to the subscribed slice of the terminal device and the subscribed slice change indication. If the NSSF entity is an NSSF entity of the V-PLMN, V-PLMN S-NSSAI corresponding to the subscribed slice is found, and a V-PLMN index list of S-NSSAI is generated, wherein the index is unique in the whole PLMN. The NSSF entity may also decide allowed NSSAI, and at the same time generate configured NSSAI (which may also be called subscribed S-NSSAIs) if a subscribed slice change indication is received. The index list of S-NSSAI may be a part of the configured NSSAI or one separate parameter. The NSSF entity sends the index list of S-NSSAI, the allowed NSSAI, the configured NSSAI to the AMF entity.

In an implementation of the first example, the first information is Registration accept of a Registration request sent for the terminal device, and the Registration request corresponds to one of an initial registration, a mobility registration, and an emergency registration.

In another implementation of the first example, the first information is a configuration update command.

In some implementations of the first example, the first information also includes at least one of the following: allowed NSSAI, configured NSSAI, and Network slicing indication for indicating whether a subscribed slice has changed.

In the first example, for example, in a case that the Network slicing indication indicates that the subscribed slice has changed, the terminal device deletes index information of S-NSSAIs of a network other than the serving network. In other words, the Network slicing indication is used for the terminal device to delete the index information of the S-NSSAIs of the network other than the serving network.

For example, in a case that the Network slicing indication indicates that the subscribed slice has changed, the terminal device deletes index information of S-NSSAIs of a PLMN other than the serving PLMN.

As a second example, the first information is contained in the RRC message. For example, the network device is a serving base station, that is, the serving base station sends the first information to the terminal device.

In some implementations of the second example, the index list of S-NSSAI includes the index information of part of the S-NSSAIs of the serving network, wherein the part of the S-NSSAIs include S-NSSAIs supported by a cell and S-NSSAIs supported by a neighboring cell of the cell.

In some implementations of the second example, in a case that the serving network shares a serving base station with a first network, the index list of S-NSSAI includes the index information of part of the S-NSSAIs of the serving network and index information of part of S-NSSAIs of the first network, wherein the part of the S-NSSAIs include S-NSSAIs supported by a cell and S-NSSAIs supported by a neighboring cell of the cell. That is, in this case, the index list of S-NSSAI also includes an identity or an index of the serving network, an identity or an index of the first network.

In the second example, for example, the serving base station receives the index list of S-NSSAI sent by the AMF entity.

Specifically, if there is no local configuration at a base station side, the AMF entity configures the index list of S-NSSAI, wherein the index list of S-NSSAI includes index information of S-NSSAI supported by the cell (a current cell or a serving cell) and index information of S-NSSAI supported by a neighboring cell of the cell, and the index is unique in the whole PLMN.

In the second example, for example, the RRC message is an RRC connection setup message, or the RRC message is an RRC connection reconfiguration message, or a new RRC message.

In some implementations, the serving base station may broadcast an index corresponding to S-NSSAI supported by it. Thus, broadcast resources may be saved and privacy may be protected.

Therefore, in an implementation of the present application, the network device may configure an index list of S-NSSAI including index information of part or all of S-NSSAIs of the serving network, and indicate the index list of S-NSSAI to the terminal device, so that the terminal device learns a network slice supported by the base station.

Figure 3:
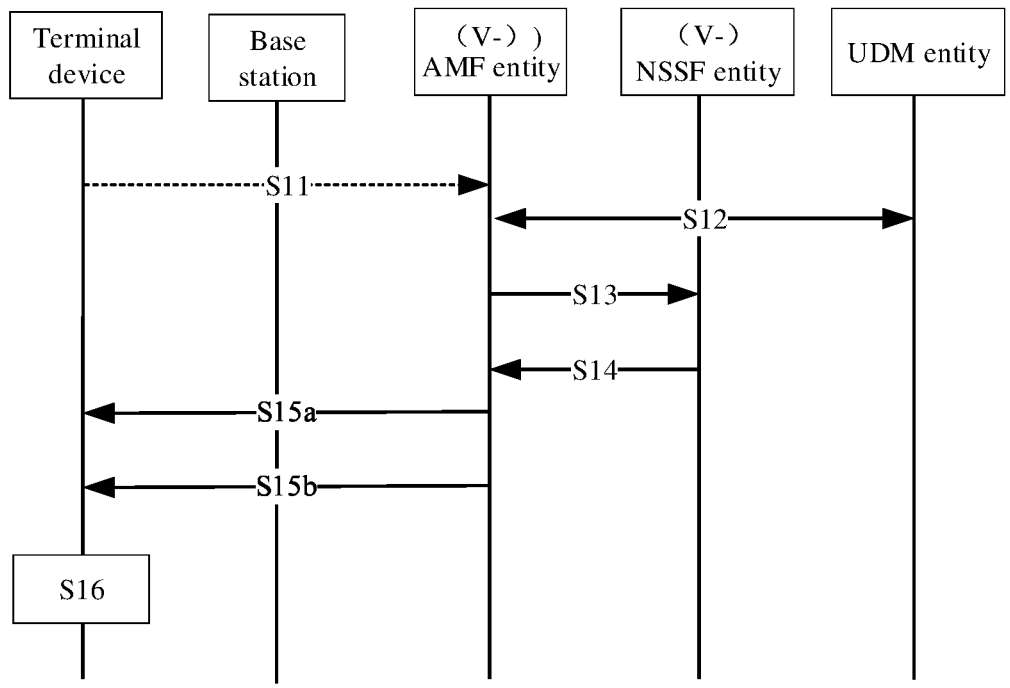
FIG. 3 is a schematic flow diagram of configuring an index list of S-NSSAI according to an implementation of the present application.

As a first implementation, the AMF entity configures the index list of S-NSSAI through the NAS layer, and the terminal device may acquire the index list of S-NSSAI through the flow shown in FIG. 3, wherein the flow shown in FIG. 3 may specifically include S11 to S16.

In S11, if the terminal device has not registered to the network, the terminal device sends a Registration request to the AMF entity, wherein the Registration request corresponds to one of an initial registration, a mobility registration, and an emergency registration.

In S12, if the AMF entity does not have a network slice subscribed by the terminal device, it is obtained from the UDM entity; or, when a network slice subscribed by the terminal device changes, the UDM entity sends the updated subscribed slice to the AMF entity; and if the AMF entity is the AMF of the V-PLMN, the UDM entity also sends a subscribed slice change indication to a V-AMF (i.e., the AMF of the V-PLMN).

In S13, the (V-)AMF entity sends the slice subscribed by the terminal device and the subscribed slice change indication to the NSSF entity, and if the AMF entity is the V-AMF, the V-AMF entity sends the slice subscribed by the terminal device and the subscribed slice change indication to the V-NSSF entity (i.e., an NSSF of the V-PLMN), and may indicate that the NSSF entity is required to provide the index list of S-NSSAI.

In some implementations, if the AMF entity is locally configured with an index corresponding to the slice, a Subscribed index list of S-NSSAI is generated; if the AMF entity is the AMF of the V-PLMN, V-PLMN S-NSSAI corresponding to the subscribed slice is found and a V-PLMN index list of S-NSSAI is generated; that is to say, an index corresponding to S-NSSAI of the current PLMN is unique in the whole PLMN.

In S14, the (V-)NSSF entity generates a Subscribed index list of S-NSSAI according to the subscribed slice and the subscribed slice change indication of the terminal device, if the NSSF entity is an NSSF of the V-PLMN (i.e., a V-NSSF), V-PLMN S-NSSAI corresponding to the subscribed slice is found, and a V-PLMN index list of S-NSSAI is generated, wherein the index is unique in the whole PLMN; the (V-)NSSF entity may also decide allowed NSSAI and at the same time generate configured NSSAI (which may also be called subscribed S-NSSAIs) if the subscribed slice change indication is received; the index list of S-NSSAI may be a part of the configured NSSAI, or one separate parameter; in addition, the (V-)NSSF sends the index list of S-NSSAI, the allowed NSSAI, and the configured NSSAI to the (V-)AMF.

In 515*a*, if the above S11 is executed, the (V-)AMF replies a Registration accept to the terminal device, which contains the index list of S-NSSAI, the allowed NSSAI, the configured NSSAI, and a Network slicing indication for indicating whether the subscribed slice has changed.

In 515*b*, if the above S11 is not executed, the UDM entity updates to the (V-)AMF because of the subscribed slice, then the AMF entity sends a configuration update command to the terminal device, which contains the index list of S-NS-SAI, the allowed NSSAI, and the configured NSSAI.

In S16, the terminal device stores the index list of S-NSSAI, the list being associated with the current PLMN, and sends the list or slices corresponding to services used according to a need and their indices to the AS layer, such as the RRC layer; and the AS layer uses the indices to find a cell that can support these indices as its own resident cell. If the terminal device also receives the Network slicing indication indicating that the subscribed slice changes, the terminal device deletes indices corresponding to other PLMNs.

Figure 4:
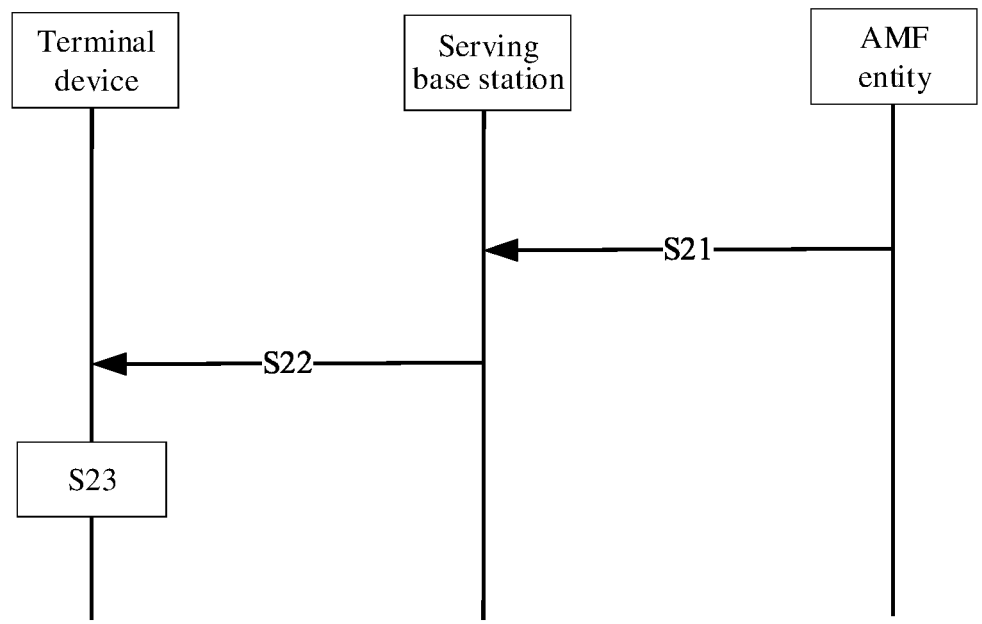
FIG. 4 is another schematic flow chart of configuring an index list of S-NSSAI according to an implementation of the present application.

As the second implementation, the serving base station configures the index list of S-NSSAI through the RRC layer, and the terminal device may acquire the index list of S-NSSAI through the flow shown in FIG. 4, wherein the flow shown in FIG. 4 may specifically include S21 to S23.

In S21, if the serving base station has no local configuration, the AMF entity configures the index list of S-NSSAI, and sends the index list of S-NSSAI to the serving base station through the N2 message, wherein the index list of S-NSSAI includes index information of S-NSSAI supported by a cell (a current cell or a serving cell) and index information of S-NSSAI supported by a neighboring cell of the cell, and the index is unique in the whole PLMN.

In S22, the service base station sends the index list of S-NSSAI to the terminal device through the RRC message; wherein the RRC message may be an RRC connection setup message, an RRC connection reconfiguration message, or a new RRC message.

In S23, the terminal device stores the index list of S-NSSAI. The terminal device uses the indices in the index list of S-NSSAI to find a cell that can support these indices as its own resident cells.

It should be noted that the first implementation and the second implementation described above are described by taking the serving network as the PLMN as an example. Of course, the serving network as SNPN is also applicable and will not be repeated here.

Method implementations of the present application are described in detail above in combination with FIGS. 2 to 4, and device implementations of the present application will be described in detail below in combination with FIGS. 5 to 9. It should be understood that the apparatus implementations correspond to the method implementations and can be described with reference to the method implementations.

Figure 5:
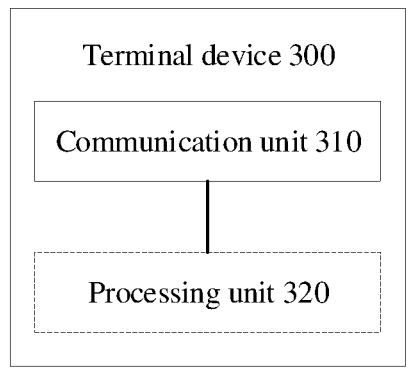
FIG. 5 is a schematic block diagram of a terminal device in accordance with an implementation of the present application.

FIG. 5 shows a schematic block diagram of a terminal device 300 in accordance with an implementation of the present application. As shown in FIG. 5, the terminal device 300 includes a communication unit 310.

The communication unit 310 is configured to receive first information; wherein the first information includes an index list of Single-Network Slice Selection Assistance Information (S-NSSAI), wherein the index list of S-NSSAI includes index information of part or all of S-NSSAIs of a serving network.

In some implementations, the first information is contained in a Non-Access Stratum (NAS) message.

In some implementations, the index list of S-NSSAI includes the index information of all of the S-NSSAIs of the serving network.

In some implementations, index information of part of the S-NSSAIs among the index information of all of the S-NS-SAIs contains index information of S-NSSAIs subscribed by the terminal device.

In some implementations, the first information is Registration accept of a Registration request sent for the terminal device, and the Registration request corresponds to one of an initial registration, a mobility registration, and an emergency registration.

In some implementations, the first information is a configuration update command.

In some implementations, the serving network is a visited network.

In some implementations, the first information also includes at least one of the following: allowed Network Slice Selection Assistance Information (NSSAI), configured NSSAI, and Network slicing indication for indicating whether a subscribed slice has changed.

In some implementations, the terminal device 300 also includes: a processing unit 320, wherein in a case that the Network slicing indication indicates that the subscribed slice has changed, the processing unit 320 is configured to delete index information of S-NSSAIs of a network other than the serving network.

In some implementations, the communication unit 310 is specifically configured to: receive the first information sent by an AMF entity.

In some implementations, the first information is contained in a Radio Resource Control (RRC) message.

In some implementations, the index list of S-NSSAI includes the index information of part of the S-NSSAIs of the serving network, wherein the part of the S-NSSAIs includes S-NSSAIs supported by a cell and S-NSSAIs supported by a neighboring cell of the cell.

In some implementations, in a case where the serving network shares a serving base station with a first network, the index list of S-NSSAI includes the index information of part of the S-NSSAIs of the serving network and index information of part of S-NSSAIs of the first network, wherein the part of the S-NSSAIs include S-NSSAIs supported by a cell and S-NSSAIs supported by a neighboring cell of the cell.

In some implementations, the RRC message is an RRC connection setup message, or the RRC message is an RRC connection reconfiguration message.

In some implementations, the communication unit 310 is specifically configured to: receive the first information sent by the serving base station.

In some implementations, the terminal device 300 also includes: a processing unit 320, wherein the processing unit 320 is configured to execute at least one of the following according to the index list of S-NSSAI: cell selection, cell reselection, and search before cell handover.

In some implementations, the serving network is a Public Land Mobile Network (PLMN) or Stand-alone Non-public Networks (SNPN).

In some implementations, in some implementations, the above communication unit may be a communication interface or a transceiver, or an input/output interface of a communication chip or a system on a chip. The processing unit may be one or more processors.

It should be understood that the terminal device 300 in accordance with the implementation of the present application may correspond to the terminal device in the method implementation of the present application, and the above-mentioned and other operations and/or functions of various units in the terminal device 300 are respectively for implementing corresponding processes of the terminal device in the method 200 shown in FIG. 2, and will not be repeated herein for brevity.

Figure 6:
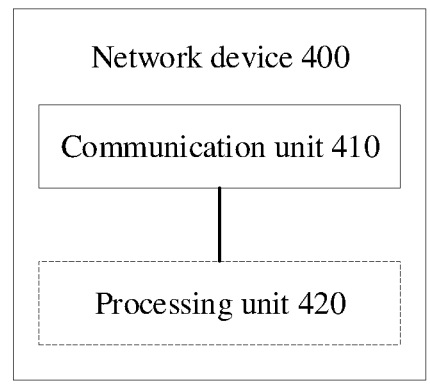
FIG. 6 is a schematic block diagram of a network device in accordance with an implementation of the present application.

FIG. 6 shows a schematic block diagram of a network device 400 in accordance with an implementation of the present application. As shown in FIG. 6, the network device 400 includes a communication unit 410.

The communication unit 410 is configured to send first information to a terminal device; wherein the first information includes an index list of Single-Network Slice Selection Assistance Information (S-NSSAI), wherein the index list of S-NSSAI includes index information of part or all of S-NSSAIs of a serving network.

In some implementations, the first information is contained in a Non-Access Stratum (NAS) message.

In some implementations, the index list of S-NSSAI includes the index information of all of the S-NSSAIs of the serving network.

In some implementations, index information of part of the S-NSSAIs among the index information of all of the S-NSSAIs contains index information of S-NSSAIs subscribed by the terminal device.

In some implementations, the network device 400 also includes: a processing unit 420, wherein the processing unit 420 is configured to generate the index list of S-NSSAI according to indices corresponding to S-NSSAIs of the serving network.

In some implementations, the communication unit 410 is also configured to receive the index list of S-NSSAI sent by a Network Slice Selection Function (NSSF) entity.

In some implementations, the first information is Registration accept of a Registration request sent for the terminal device, and the Registration request corresponds to one of an initial registration, a mobility registration, and an emergency registration.

In some implementations, the first information is a configuration update command.

In some implementations, the serving network is a visited network.

In some implementations, the first information also includes at least one of the following: allowed Network Slice Selection Assistance Information (NSSAI), configured NSSAI, and Network slicing indication for indicating whether a subscribed slice has changed.

In some implementations, in a case that the Network slicing indication indicates that the subscribed slice has changed, the Network slicing indication is used for the terminal device to delete index information of S-NSSAIs of a network other than the serving network.

In some implementations, the network device is an Access and Mobility Management Function (AMF) entity.

In some implementations, the first information is contained in a Radio Resource Control (RRC) message.

In some implementations, the index list of S-NSSAI includes the index information of part of the S-NSSAIs of the serving network, wherein the part of the S-NSSAIs includes S-NSSAIs supported by a cell and S-NSSAIs supported by a neighboring cell of the cell.

In some implementations, in a case that the serving network shares a serving base station with a first network, the index list of S-NSSAI includes the index information of part of the S-NSSAIs of the serving network and index information of part of S-NSSAIs of the first network, wherein the part of the S-NSSAIs include S-NSSAIs supported by a cell and S-NSSAIs supported by a neighboring cell of the cell.

In some implementations, the communication unit 410 is also configured to receive the index list of S-NSSAI sent by an AMF entity.

In some implementations, the RRC message is an RRC connection setup message, or the RRC message is an RRC connection reconfiguration message.

In some implementations, the network device is the serving base station.

In some implementations, the index list of S-NSSAI is used for the terminal device to execute at least one of the following: cell selection, cell reselection, and search before cell handover.

In some implementations, the serving network is a Public Land Mobile Network (PLMN) or Stand-alone Non-public Networks (SNPN).

In some implementations, the above communication unit may be a communication interface or a transceiver, or an input/output interface of a communication chip or a system on a chip. The processing unit may be one or more processors.

It should be understood that the network device 400 in accordance with the implementation of the present application may correspond to the network device in the method implementation of the present application, and the above-mentioned and other operations and/or functions of various units in the network device 400 are respectively for implementing corresponding processes of the network device in the method 200 shown in FIG. 2, and will not be repeated herein for brevity.

Figure 7:
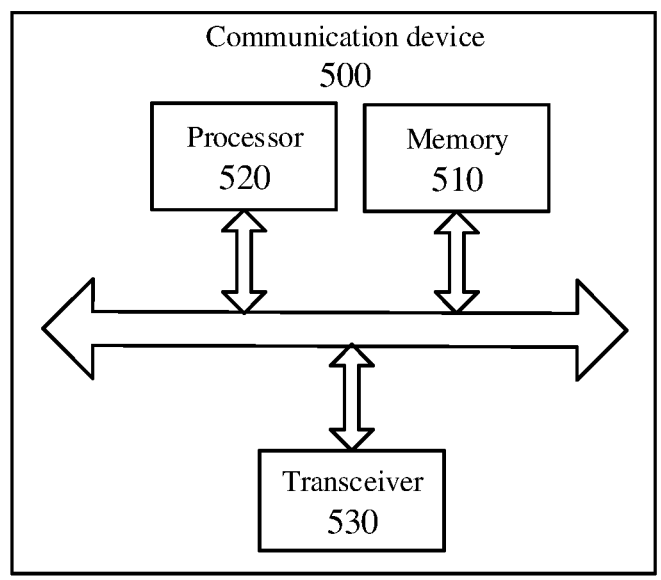
FIG. 7 is a schematic block diagram of a communication device in accordance with an implementation of the present application.

FIG. 7 is a schematic structure diagram of a communication device 500 in accordance with an implementation of the present application. The communication device 500 shown in FIG. 7 includes a processor 510, which may call and run a computer program from a memory to implement the methods according to the implementations of the present application.

In some implementations, as shown in FIG. 7, the communication device 500 may also include a memory 520. The processor 510 may call and run a computer program from the memory 520 to implement the method in the implementation of the present application.

The memory 520 may be a separate device independent of the processor 510, or may be integrated in the processor 510.

In some implementations, as shown in FIG. 7, the communication device 500 may also include a transceiver 530, and the processor 510 may control the transceiver 530 to communicate with another device. Specifically, the transceiver 530 may send information or data to another device or receive information or data sent by another device.

The transceiver 530 may include a transmitter and a receiver. The transceiver 530 may further include antennas, a quantity of which may be one or more.

In some implementations, the communication device 500 may specifically be the network device according to the implementations of the present application, and the communication device 500 may implement corresponding flows implemented by the network device in various methods in the implementations of the present application, which will not be repeated here for brevity.

In some implementations, the communication device 500 may be specifically the terminal device in the implementations of the present application, and the communication device 500 may implement corresponding flows implemented by the terminal device in various methods in the implementations of the present application, which will not be repeated here for brevity.

Figure 8:
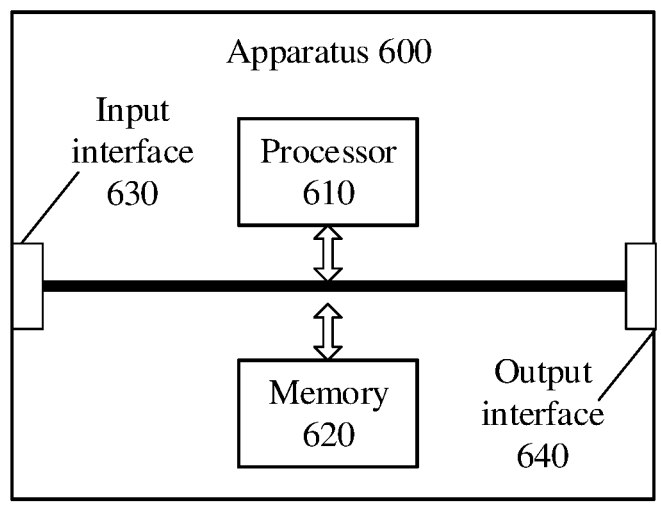
FIG. 8 is a schematic block diagram of an apparatus in accordance with an implementation of the present application.

FIG. 8 is a schematic structural diagram of an apparatus in accordance with an implementation of the present application. The apparatus 600 shown in FIG. 8 includes a processor 610. The processor 610 may call and run a computer program from a memory to implement the methods in the implementations of the present application.

In some implementations, as shown in FIG. 8, the apparatus 600 may also include a memory 620. The processor 610 may call and run a computer program from the memory 620 to implement the method in the implementation of the present application.

The memory 620 may be a separate device independent of the processor 610, or may be integrated in the processor 610.

In some implementations, the apparatus 600 may also include an input interface 630. The processor 610 may control the input interface 630 to communicate with another device or chip. Specifically, the processor 610 may acquire information or data sent by another device or chip.

In some implementations, the apparatus 600 may also include an output interface 640. The processor 610 may control the output interface 640 to communicate with another device or chip. Specifically, the processor 610 may output information or data to another device or chip.

In some implementations, the apparatus may be applied to the network device in the implementations of the present application, and the apparatus may implement corresponding flows implemented by the network device in various methods in the implementations of the present application, which will not be repeated here for brevity.

In some implementations, the apparatus may be applied to the terminal device in the implementations of the present application, and the apparatus may implement corresponding flows implemented by the terminal device in various methods in the implementations of the present application, which will not be repeated here for brevity.

In some implementations, the apparatus mentioned in the implementation of the present application may also be a chip. For example, it may be a system-level chip, a system chip, a chip system, or a system on chip, etc.

Figure 9:
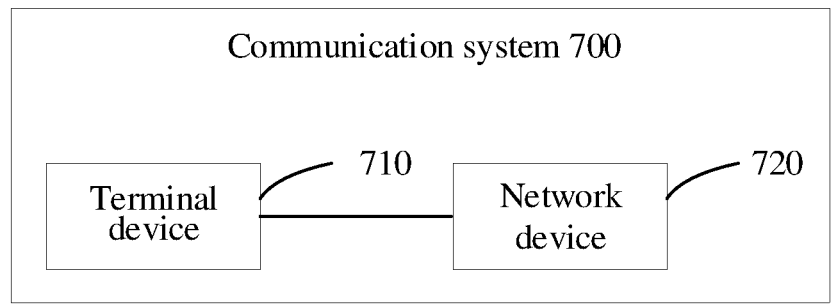
FIG. 9 is a schematic block diagram of a communication system in accordance with an implementation of the present application.

FIG. 9 is a schematic block diagram of a communication system 700 in accordance with an implementation of the present application. As shown in FIG. 9, the communication system 700 includes a terminal device 710 and a network device 720.

The terminal device 710 may be configured to implement the corresponding functions implemented by the terminal device in the above-mentioned methods, and the network device 720 may be configured to implement the corresponding functions implemented by the network device in the above-mentioned methods, which will not be repeated herein for brevity.

It should be understood that the processor in the implementations of the present application may be an integrated circuit chip with a capability for processing signals. In an implementation process, various acts of the method implementations described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or transistor logic device, or a discrete hardware component. The processor may implement various methods, acts, and logic block diagrams disclosed in the implementations of the present application. The general purpose processor may be a microprocessor or the processor may be any conventional processor. The acts of the methods disclosed in connection with the implementations of the present application may be directly embodied by execution of a hardware decoding processor, or by execution of a combination of hardware and software modules in a decoding processor. The software modules may be located in a storage medium commonly used in the art, such as a random access memory, a flash memory, a read-only memory, a programmable read-only memory or an electrically erasable programmable memory, or a register. The storage medium is located in a memory, and a processor reads information in the memory and completes the acts of the above methods in combination with its hardware.

It should be understood that the memory in the implementations of the present application may be a transitory memory or a non-transitory memory, or may include both transitory and non-transitory memories. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that the above memories are described as examples rather than limitations. For example, the memory in the implementations of the present application may be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a direct Rambus RAM (DR RAM), etc. That is to say, the memories in the implementations of the present application are intended to include, but are not limited to, these and any other suitable types of memories.

An implementation of the present application also provides a computer readable storage medium, configured to store a computer program.

In some implementations, the computer readable storage medium may be applied to the network device in the implementations of the present application, and the computer program causes a computer to perform corresponding flows implemented by the network device in various methods in the implementations of the present application, which will not be repeated here for brevity.

In some implementations, the computer readable storage medium may be applied in the terminal device of the implementations of the present application, and the computer program causes a computer to perform corresponding flows implemented by the terminal device in various methods in the implementations of the present application, which will not be repeated here for brevity.

An implementation of the present application also provides a computer program product, including computer program instructions.

In some implementations, the computer program product may be applied to the network device in the implementations of the present application, and the computer program instructions cause a computer to perform corresponding flows implemented by the network device in various methods in the implementations of the present application, which will not be repeated here for brevity.

In some implementations, the computer program product may be applied to the terminal device in the implementations of the present application, and the computer program instructions cause a computer to perform corresponding flows implemented by the terminal device in various methods in the implementations of the present application, which will not be repeated here for brevity.

An implementation of the present application also provides a computer program.

In some implementations, the computer program may be applied to the network device in the implementations of the present application. When the computer program is run on a computer, the computer is caused to perform corresponding flows implemented by the network device in various methods in the implementations of the present application, which will not be repeated here for brevity.

In some implementations, the computer program may be applied to the terminal device in the implementations of the present application. When the computer program is run on a computer, the computer is caused to perform corresponding flows implemented by the terminal device in various methods in the implementations of the present application, which will not be repeated here for brevity.

Those of ordinary skills in the art will recognize that units and algorithm acts of various examples described in connection with the implementations disclosed herein may be implemented in electronic hardware, or a combination of computer software and electronic hardware. Whether these functions are implemented in a form of hardware or software depends on a specific application and a design constraint of a technical solution. Those skilled in the art may use different methods to implement the described functions for each specific application, but such implementation should not be considered to be beyond the scope of the present application.

Those skilled in the art may clearly understand that for convenience and conciseness of description, specific working processes of the systems, apparatuses, and units described above may refer to corresponding processes in the aforementioned method implementations, and details will not be repeated here.

In several implementations according to the present application, it should be understood that the disclosed systems, apparatuses, and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. In addition, coupling or direct coupling or communication connection shown or discussed between each other, which may be indirect coupling or communication connection between the devices or units via some interfaces, may be electrical, mechanical, or in other forms.

The units described as separate components may be or may be not physically separated, and the component shown as a unit may be or may be not a physical unit, i.e., it may be located in one place or may be distributed on multiple network units. Part or all of units may be selected according to actual needs to achieve purposes of technical solutions of the implementations.

In addition, various functional units in various implementations of the present application may be integrated in one processing unit, or various units may be physically present separately, or two or more units may be integrated in one unit.

The functions, if implemented in a form of software functional units and sold or used as an independent product, may be stored in a computer readable storage medium. For such understanding, the technical solutions of the present application, in essence, or the part which contributes to the prior art, or part of the technical solutions, may be embodied in the form of a software product, wherein the computer software product is stored in one storage medium including a number of instructions for causing one computer device (which may be a personal computer, a server, or a network device, etc.) to perform all or part of the acts of the methods according to various implementations of the present application. The aforementioned storage medium includes various media capable of storing program codes, such as a U disk, a mobile hard disk, a read-only memory (ROM), a random access memory (RAM), a magnetic disk, or an optical disk, etc.

The foregoing are merely specific implementations of the present application, but the protection scope of the present application is not limited thereto. Any person skilled in the art may readily conceive variations or substitutions within the technical scope disclosed by the present application, which should be included within the protection scope of the present application. Therefore, the protection scope of the present application shall be subject to the protection scope of the claims.

We claim:
1. A wireless communication method, comprising:
receiving, by a terminal device, first information; wherein the first information comprises an index list of Single-Network Slice Selection Assistance Information (S-NSSAI), wherein the index list comprises index information of part or all of S-NSSAIs of a serving network;
wherein the first information is contained in a Non-Access Stratum (NAS) message; and the first information is Registration accept of a Registration request sent by the terminal device, and the Registration request corresponds to one of a mobility registration and an emergency registration,
wherein the serving network is a visited network; and the first information further comprises:
allowed Network Slice Selection Assistance Information (NSSAI) and configured NSSAI;
wherein the method further comprises:
sending, by the terminal device, the index list of S-NSSAI to an Access Stratum (AS) of the terminal device; and the AS of the terminal device is configured to use indices to select a cell supporting the indices as a resident cell of the terminal device.
2. The method of claim 1, wherein
the first information further comprises:
Network slicing indication for indicating whether a subscribed slice has changed.
3. A terminal device, comprising:
a transceiver, configured to receive first information; wherein
the first information comprises an index list of Single-Network Slice Selection Assistance Information (S-NSSAI), wherein the index list comprises index information of part or all of S-NSSAIs of a serving network;
wherein the first information is contained in a Non-Access Stratum (NAS) message; and the first information is Registration accept of a Registration request sent by the terminal device, and the Registration request corresponds to one of a mobility registration and an emergency registration,
wherein the serving network is a visited network; and the first information further comprises:

allowed Network Slice Selection Assistance Information (NSSAI) and configured NSSAI;

wherein the transceiver is further configured to send the index list of S-NSSAI to an Access Stratum (AS) of the terminal device; and the AS of the terminal device is configured to use indices to select a cell supporting the indices as a resident cell of the terminal device.

4. The terminal device of claim 3, wherein the first information further comprises:

Network slicing indication for indicating whether a subscribed slice has changed.

5. The terminal device of claim 3, wherein the transceiver is further configured to receive the first information sent by an Access and Mobility Management Function (AMF) entity.

6. The terminal device of claim 3, further comprising a processor configured to perform at least one of the following according to the index list of S-NSSAI:

cell selection, cell reselection, or search before cell handover.

7. A network device, comprising:

a transceiver, configured to send first information to a terminal device; wherein the first information comprises an index list of Single-Network Slice Selection Assistance Information (S-NSSAI), wherein the index list comprises index information of part or all of S-NSSAIs of a serving network; wherein the first information is contained in a Non-Access Stratum (NAS) message; and the first information is Registration accept of a Registration request sent by the terminal device, and the Registration request corresponds to one of a mobility registration and an emergency registration, wherein the serving network is a visited network; and the first information further comprises:

allowed Network Slice Selection Assistance Information (NSSAI) and configured NSSAI;

wherein the transceiver is further configured to receive the index list of S-NSSAI sent by a Network Slice Selection Function, NSSF, entity, wherein the index list of S-NSSAI is used for the terminal device to perform at least one of the following:

cell selection, cell reselection, or search before cell handover.

8. The network device of claim 7, wherein the first information further comprises:

Network slicing indication for indicating whether a subscribed slice has changed.

9. The network device of claim 7, wherein the network device is an Access and Mobility Management Function (AMF) entity.

* * * * *